Horace M. Keith.
*PLOW.*

No. 121,382.  Patented Nov. 28, 1871.

Witnesses
John A. Ellis.
J. W. White.

Inventor,
Horace M. Keith,
Per.
J. H. Alexander
Atty.

121,382

UNITED STATES PATENT OFFICE.

HORACE M. KEITH, OF COMMERCE, MICHIGAN.

IMPROVEMENT IN PLOWS.

Specification forming part of Letters Patent No. 121,382, dated November 28, 1871; antedated November 17, 1871.

*To all whom it may concern:*

Be it known that I, HORACE M. KEITH, of Commerce, in the county of Oakland and State of Michigan, have invented certain new and useful Improvements in Plows; and I do hereby declare that the following is a full, clear, and exact description thereof, reference being had to the accompanying drawing and to the letters of reference marked thereon which form a part of this specification.

The nature of my invention consists in the construction and arrangement of an edger to be used on a plow, with or without a colter or cutter-point, for cutting the sod off the upper corner of a furrow-slice while the furrow is passing over the mold-board, the edger being used for cutting the sod off the overlap and throwing it into the furrow-trench before the furrow is thrown in by the plow.

In order to enable others skilled in the art to which my invention appertains to make and use the same, I will now proceed to describe its construction and operation, referring to the annexed drawing, in which—

Figure 1:
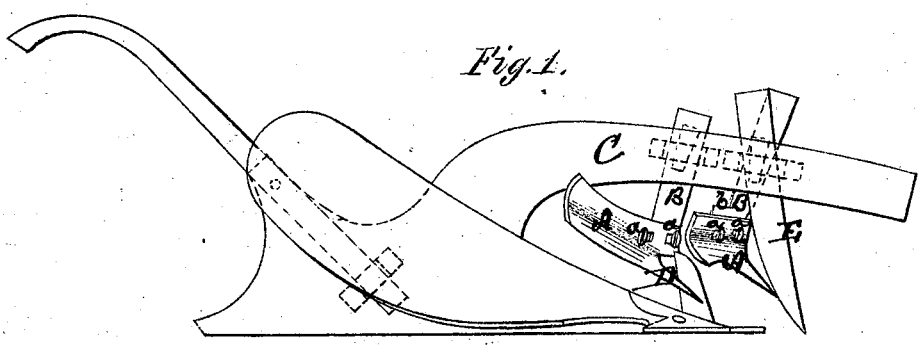
Figure 2:
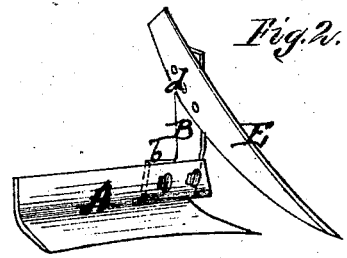
Figure 3:
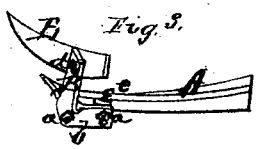

Figure 1 is a side view of a plow with my edger attached thereto, and Fig. 2 shows the edger attached to the colter. Fig. 3 is a plan view of the same.

A represents the edger, having a concave cutting-edge, attached to a standard or bar, B, by means of two bolts, $a\ a$. The lower end of this bar has an extension, $b$, on the side, as shown, to which the edger is fastened. The outer bolt $a$ passes through a slot in said extension $b$, whereby the edger is adjusted vertically on the outer end so as to cut more or less of the furrow-slice. On this same bolt are also washers $e$, which may be changed so as to bring the outer end of the edger more or less square across the furrow for cutting the sod off more perfectly. In stiff sod the edger should stand almost square across the furrow. The holes in the edger through which the bolts $a\ a$ pass are both elongated, so that the edger can be adjusted across the standard or sidewise, for the purpose of keeping the point of the edger behind the colter or beside it, or beside a cutter-point. Where a cutter-point is used, as shown at D, I cut a three-cornered piece out of the end of the edger where it is attached to the standard so as to give room for the cutter-point, the point of the edger being placed along the side of the cutter-point. The same may be done in some cases with a colter where the colter is set well back; but, generally, there is no need of this when the edger is used with a colter. The standard B is fastened to the plow-beam C in the same clasp with the colter E, or, when no colter is used in the colter-clasp, the standard may be attached to the colter itself by means of a bolt, as shown at, $d$, in which case I make several holes through the colter for the purpose of adjusting the standard up or down, as may be necessary.

Having thus fully described my invention, what I claim as new, and desire to secure by Letters Patent, is—

As an improvement upon my former patent dated October 18, 1870, the standard B with vertically-slotted arm $b$, in combination with the concave edger A having elongated bolt-holes $a\ a$, and washer $e$, substantially as and for the purpose set forth.

In testimony that I claim the foregoing as my own I affix my signature in presence of two witnesses.

HORACE M. KEITH.

Witnesses:
J. A. FAIRFIELD,
D. D. OLMSTEAD.

(114)